(12) United States Patent
Adams et al.

(10) Patent No.: US 6,209,195 B1
(45) Date of Patent: *Apr. 3, 2001

(54) METHOD OF MOUNTING A CONNECTOR ON A PRINTED WIRING BOARD

(75) Inventors: Joel Adams, Pflugerville; David Bryant, Austin; William Franklin Dunn, Jr., Austin; Doug Erwin, Austin; Mary E. Kingsbury, North Richland Hills, all of TX (US); Klaus Krosen, Isselburg; Friedhelm Luettecke, Regensburg, both of (DE); Wayne McKinnon, Georgetown; William McRight, Round Rock, both of TX (US)

(73) Assignee: Siemens Information and Communication Networks, Inc., Boca Raton, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/105,680

(22) Filed: Jun. 26, 1998

Related U.S. Application Data

(62) Division of application No. 08/690,781, filed on Jul. 23, 1996.

(51) Int. Cl.$^7$ ........................................ H05K 3/30
(52) U.S. Cl. .................................. 29/832; 29/840
(58) Field of Search .......................... 29/825, 837, 832, 29/842, 843, 840

(56) References Cited

U.S. PATENT DOCUMENTS

| | | | | |
|---|---|---|---|---|
| 5,155,904 | * | 10/1992 | Majd | ...................................... 29/837 |
| 5,337,467 | * | 8/1994 | Koqure et al. | ..................... 29/832 X |
| 5,581,875 | * | 12/1996 | Hibino et al. | ....................... 29/837 X |

* cited by examiner

Primary Examiner—Carl J. Arbes

(57) ABSTRACT

A surface mount connector that can be used for both single and double-sided PWB's. A telephone may have a printed wiring board with connector access from the bottom of the telephone and keypad activation from the top of the telephone. If a double-sided PWB is used, the connector is mounted to the bottom side of the PWB, while the keypad is mounted to the top of the PWB. The connector faces away from the PWB to provide access from below the telephone. If a single-sided PWB is used, the connector is mounted to the top side of the PWB, so that the keypad can also be mounted to the top side. The connector is placed, with connector access down, into an opening through the PWB. The connector extends down through the opening in the PWB with the leads of the connector remaining on the top side of the PWB. The leads of the connector are secured to pads on the top side of the PWB.

2 Claims, 8 Drawing Sheets

METHOD OF MOUNTING A CONNECTOR ON A PRINTED WIRING BOARD

This is a divisional of application Ser. No. 08/690,781 filed on Jul. 23, 1996.

FIELD OF THE INVENTION

The present invention relates to the field of connection mechanisms for connecting to a printed wiring board (PWB).

BACKGROUND OF THE INVENTION

PWB's are used in a wide variety of electronic devices. Various types of connectors can be mounted on PWB's to transfer electronic signals to and from the PWB. Depending on the particular circumstances involved, surface mount connectors can provide well known advantages over other types of connectors, such as lower cost, manufacturing efficiencies and increased component density. The surface mount connector mechanism of the present invention can be used in any application utilizing a PWB. The present invention can also be used to implement various different types of surface mount connectors, having a variety of sizes, shapes, pin configurations and other characteristics. The preferred embodiment of the present invention is described in terms of a telephone application, including descriptions of several different types of surface mount connectors and a surface mount PWB interconnection mechanism.

SUMMARY OF THE INVENTION

A surface mount connector of the present invention can be mounted on either a first side or a second side of a PWB. The connector provides access at the first side of the PWB whether it is mounted on the first side or the second side. If the connector is to be mounted on the first side, the PWB has one or more pads on the first side. If the connector is to be mounted on the second side, the PWB has one or more pads on the second side and the PWB defines an opening through the PWB. The connector comprises a connector body having a length, a width and a height one or more signal leads. The length and width of the connector body have smaller dimensions than the opening in the PWB. The signal leads extend beyond the dimensions of the opening in the PWB. If the connector is mounted on the first side, the connector is placed on the first side so that the leads contact the pads. If the connector is mounted on the second side, the connector is placed partially through the opening from the second side so that the leads contact the pads.

The present invention also encompasses a method of mounting a connector on a PWB. The method of mounting the connector provides access to the connector from a first side of the PWB. The PWB also has an opposite side and at least one signal pad. The connector also has at least one signal lead. The method comprises the following steps. If the connector is to be mounted on the first side, the connector is placed on the first side with the signal leads of the connector making contact with the signal pads of the PWB, the signal pads of the PWB being on the first side. If the connector is to be mounted on the opposite side, the connector is placed through an opening in the PWB from the opposite side through to the first side with the signal leads of the connector making contact with the signal pads of the PWB, the signal pads of the PWB being on the opposite side. Lastly, the signal leads of the connector are secured to the signal pads of the PWB.

DETAILED DESCRIPTION OF THE PREFERRED EMBODIMENTS

The surface mount connector of the present invention is used in a family of telephones with a common industrial design and various other common design features. Each of the telephone models in the family has a different combination of features. For example, each model may have a two line or an eight line liquid crystal display (LCD) (or no display), a QWERTY style keyboard, an extended set of function keys, a speaker phone function and/or one or more option module bays.

Figure 1:
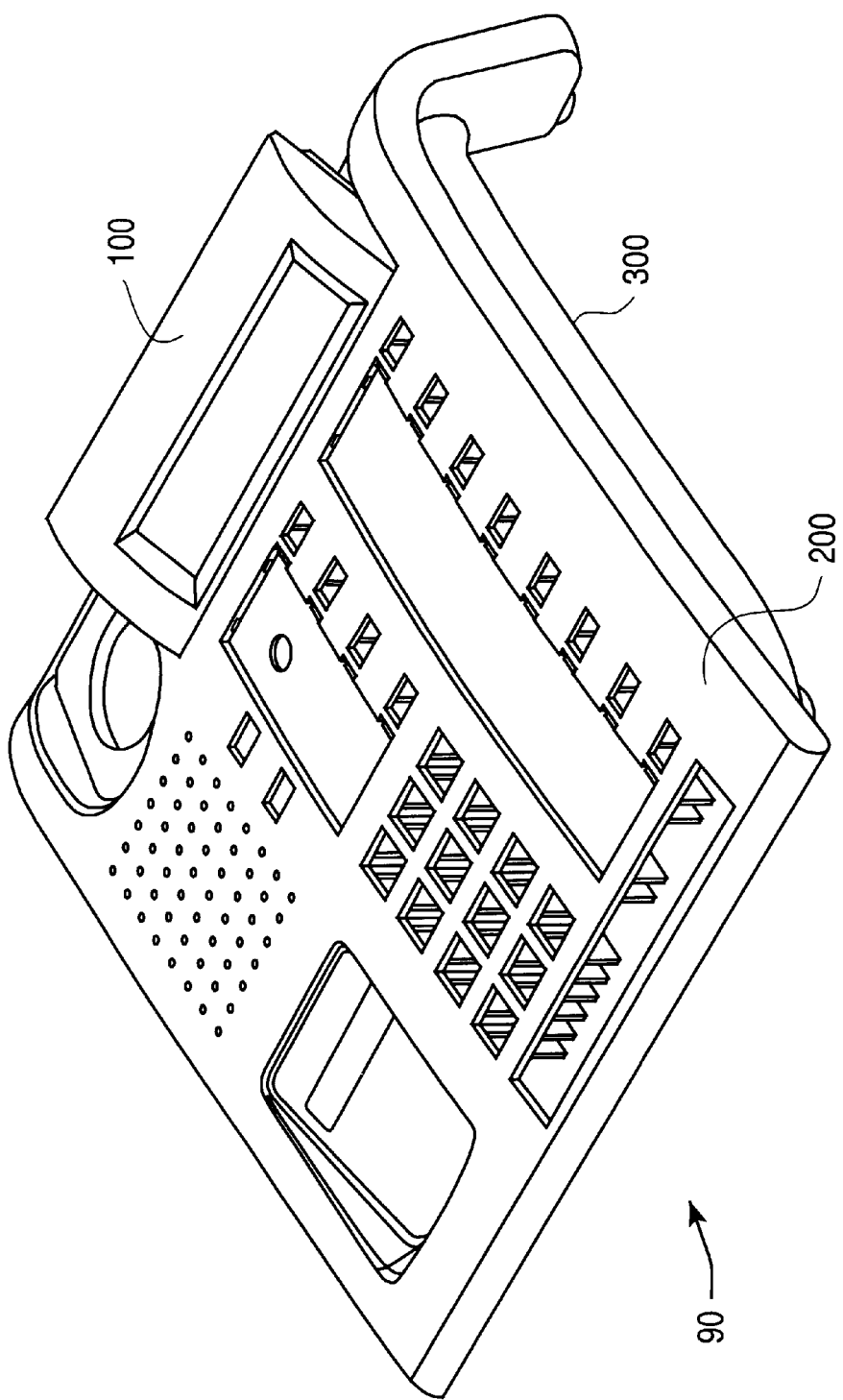
FIG. 1 is a perspective view of a telephone using several surface mount connectors of the present invention.
Figure 2:
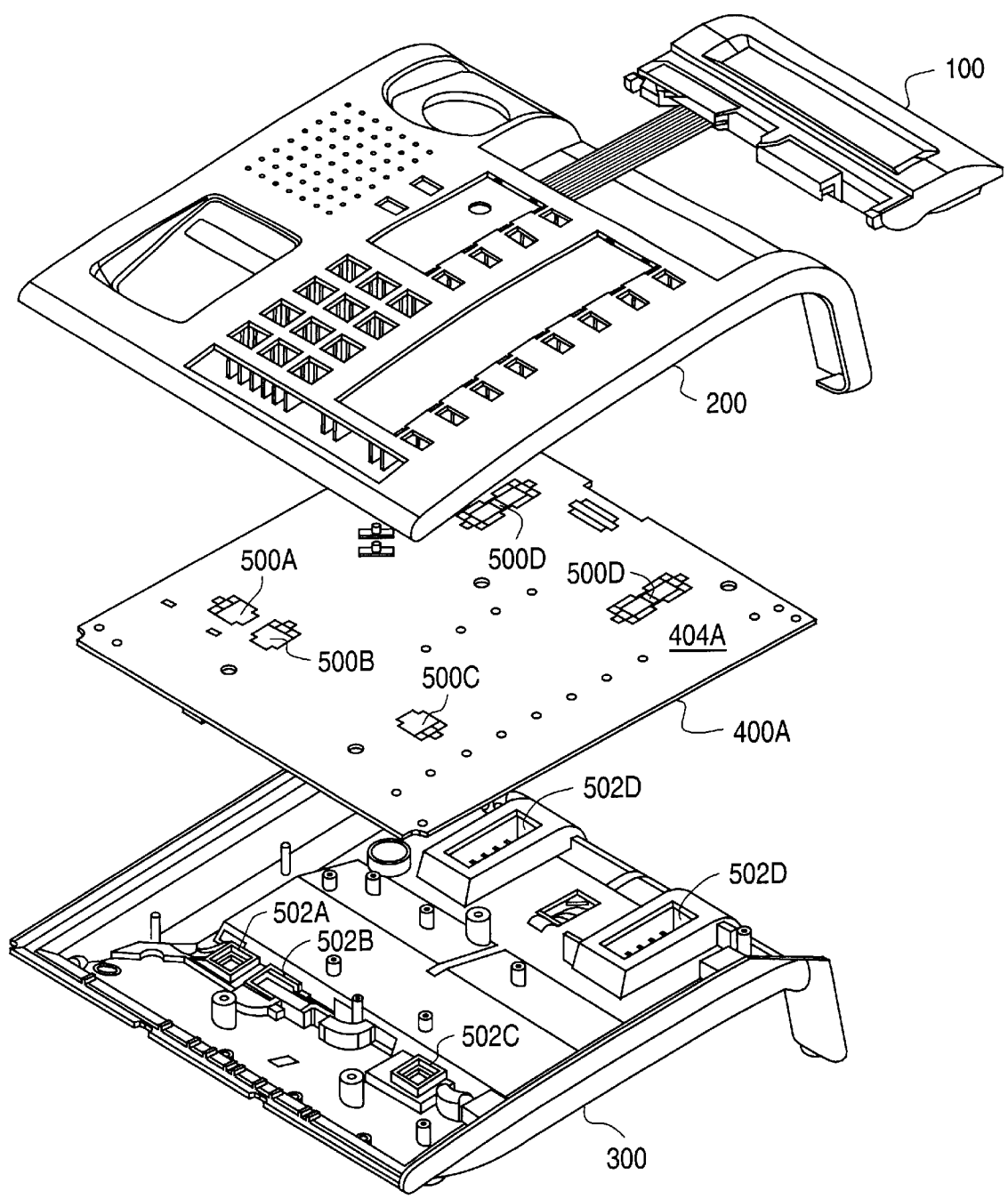
FIG. 2 is an exploded view of the telephone of FIG. 1.

FIG. 1 is a perspective view of one of the telephones in the family. The telephone 90 of FIG. 1 has a two line LCD display 100, an extended set of function keys, a speaker phone function and two option module bays. FIG. 2 is an exploded view of the telephone 90 of FIG. 1, showing the LCD display 100, an upper housing component 200, a lower housing component 300 and a single-sided PWB 400A.

FIG. 2 also illustrates a plurality of connectors 500 of the present invention mounted into an upper surface 404A of the PWB 400A and extending through to a lower surface 406A (not shown in FIG. 2). Specifically, FIG. 2 illustrates a standard Mod 4-pin connector 500A, a Mod 6-pin connector 500B, a Mod 8-pin connector 500C and a pair of card edge connectors 500D. Each of the connectors 500 is a female-type connector, with access from below. Thus, for example, a Mod 4-pin plug connector can be inserted into the connector 500A from beneath the PWB 400A.

FIG. 2 also illustrates a plurality of connector support structures 502 defined within the lower housing component 300. Specifically, FIG. 2 illustates a standard Mod 4-pin connector support structure 502A, a Mod 6-pin connector support structure 502B, a Mod 8-pin connector support structure 502C and a pair of card edge connector support structures 502D. Each of the connector support structures 502 defines an opening that allows access to the corresponding connector 500 from beneath the lower housing components 300. Thus, for example, when the telephone 90 is assembled, a Mod 4-pin plug connector can be inserted into the connector 500A through the bottom of the telephone 90 (ie. through the connector support structure 502A).

The bottom surface of the upper housing component 200 also has connector support structures (not shown). For each of the connectors 500, a support structure extends down from the bottom surface of the upper housing component 200 towards the corresponding connector 500. When the telephone 90 is assembled, each of the support structures may make contact with the corresponding connector 500 at the surface that is visible in FIG. 2, or the support structures are at least close enough to provide support to the connectors 500. Thus, when a male connector is inserted into a connector 500 from below, the corresponding support structure of the upper housing component 200 supports the connector 500 to enable enough pressure to be applied to the male connector for insertion. The surface of the support structure that provides support to the connector 500 is preferably substantially parallel with the upper surface 404A of the PWB 400A.

Each of the telephone models in the family has an upper housing component, a lower housing component and a PWB, although the size and design of each of these components varies from model to model. The most basic telephone model (not illustrated) has no display, no QWERTY style keyboard, no extended set of function keys, no speaker phone function and no option module bays. The most basic telephone model uses a single-sided PWB, having only one signal routing layer. As features are added to the most basic telephone model to obtain other telephone models, additional circuitry and, consequently, additional signal routing is required. When possible, a single-sided PWB is used to reduce cost. However, depending on the features implemented in each telephone model, a double-sided PWB may be necessary.

The same set of connectors 500 illustrated in FIG. 2 is used in all of the telephone models in the family, although not all of the connectors 500 is used in each model. For example, the most basic telephone model does not have any card edge connectors 500D, as these connectors are used in the implementation of option modules bays. In each of the telephone models, the connectors 500 are accessed from below, through the connector support structures 502, whether the telephone model utilizes a single-sided PWB or a double-sided PWB, as illustrated in FIG. 2 for a single-sided PWB.

Figure 3:
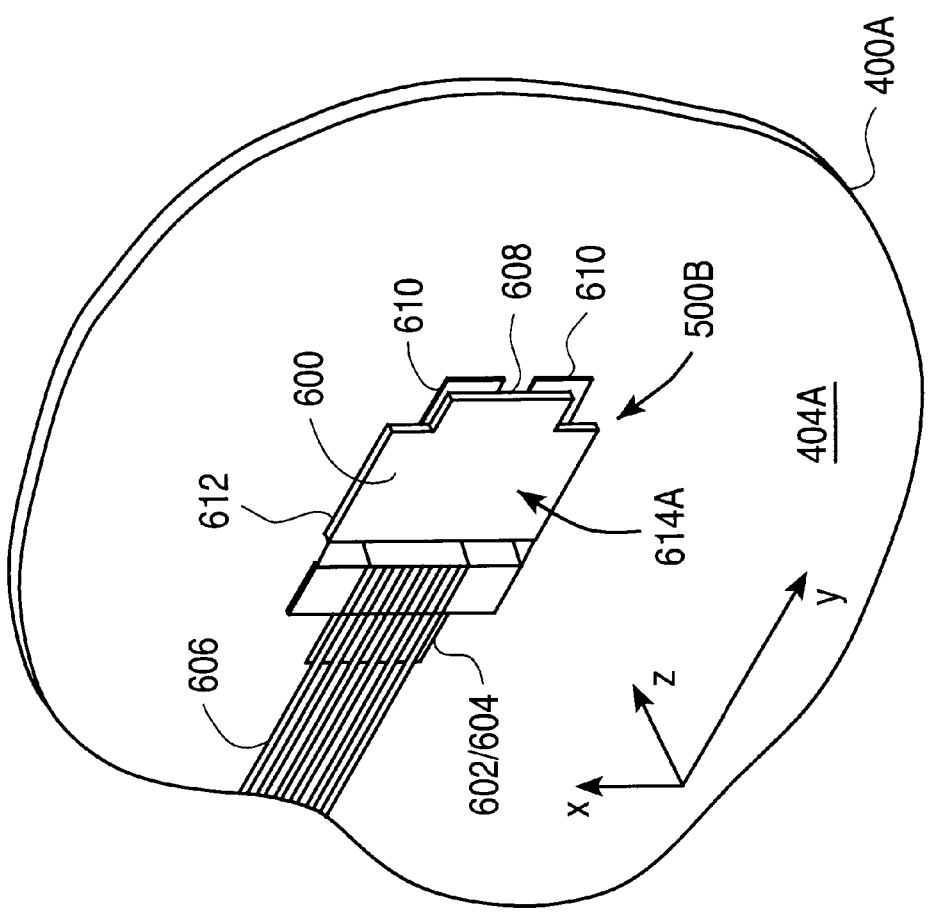
FIG. 3 is a top perspective view of a first embodiment of the surface mount connector of the present invention mounted in a single-sided PWB.
Figure 5:
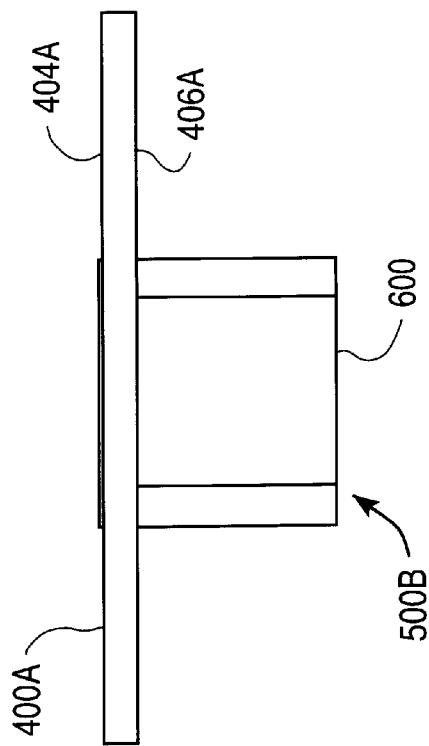
FIG. 5 is a side view of the first embodiment of the connector of the present invention mounted on a single-sided PWB.
Figure 4:
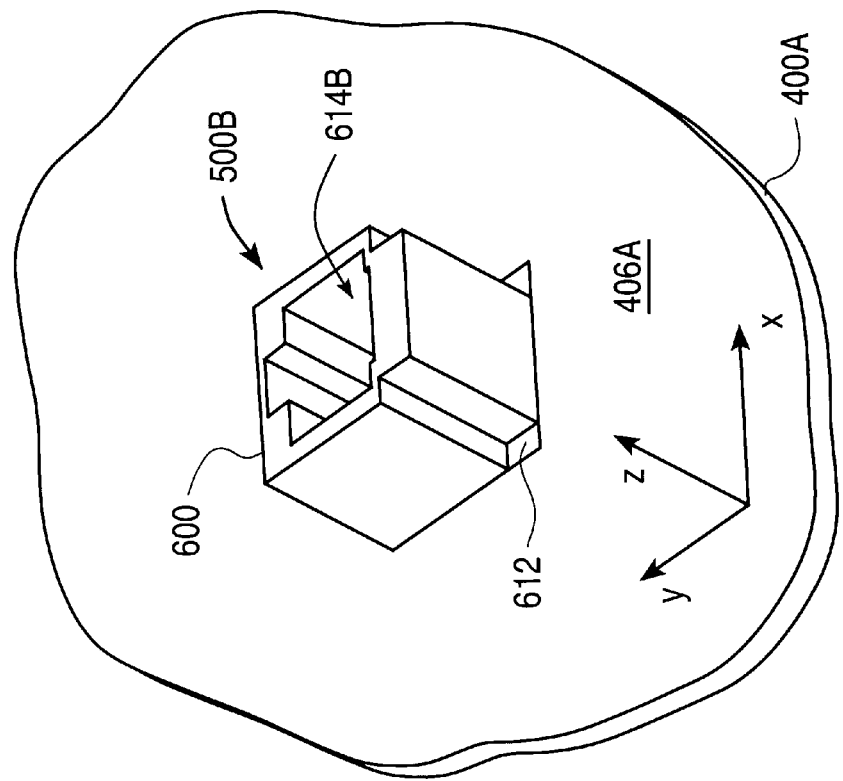
FIG. 4 is a bottom perspective view of the first embodiment of the connector of the present invention mounted on a single-sided PWB.

FIG. 3 is a top perspective view of the Mod 6-pin connector 500B of FIG. 2 mounted on the single-sided PWB 400A, showing a portion of the upper surface 404A of the PWB 400A. FIG. 4 is a bottom perspective view of the connector 500B mounted on the single-sided PWB 400A, showing a portion of the lower surface 406A of the PWB 400A. FIG. 5 is a side view of the connector 500B mounted on the single-sided PWB 400A. The connector 500B comprises a body 600, a set of six signal leads 602, a support tab 608 and a pair of pickup surfaces 614A and 614B. The pickup surface 614B is located at the far wall of the well or opening into which the male connector is inserted (at a wall that defines an X-Y plane). The PWB 400A has a set of signal pads 604, a set of six etch runs 606 and a pair of support pads 610 on the upper surface 404A. The PWB 400A also defines an opening 612 through which the connector 500B extends.

As illustrated in FIG. 4, the body 600 of the connector 500B generally defines a box-type shape (ie. a three dimensional rectangular shape), with an opening for the insertion of a corresponding male connector. For reference purposes, a Cartesian coordinate system is identified in FIGS. 3 and 4. The size of the connector 500B in the Z direction will be referred to as the height, the size of the connector 500B in the X direction will be referred to as the width; and the size of the connector 500B in the Y direction will be referred as the length. As further illustrated in FIG. 4, the width and length of the body 600 of the connector 500B are slightly less than the corresponding dimensions of the opening 612. As illustrated in FIG. 3, the signal leads 602 and the support tab 608 extend further in the negative and positive Y directions, respectively, then both the body 600 and the opening 612.

During assembly of a telephone having the connector 500B and the single-sided PWB 400A, the PWB 400A is placed with the upper surface 404A facing upward. As illustrated in FIG. 3, the signal pads 604 and the support pads 610 are on the upper surface 404A of the PWB 400A. A surface mount technology (SMT) nozzle is applied to the pick up surface 614A of the connector 500B. The SMT nozzle is then used to place the connector 500B into the opening 612 defined by the PWB 400A, with the leads 602 overlaying the pads 604 and the support tab 608 overlaying the support pads 610. The dimensions of the connector 500B are generally smaller than the dimension of the opening 612 so that the body 600 of the connector 500B extends through the PWB 400A, except that the leads 602 and the support tab 608 extend beyond the dimensions of the opening 612. After reflow, the leads 602 are secured to the pads 604, making electrical contact, and the support tab 608 is secured to the support pads 610. The leads 602 and the support tab 608 are secured to the upper surface 404A of the PWB 400A, with the body 600 of the connector 500B extending through the PWB 400A in a positive Z direction.

Figure 7:
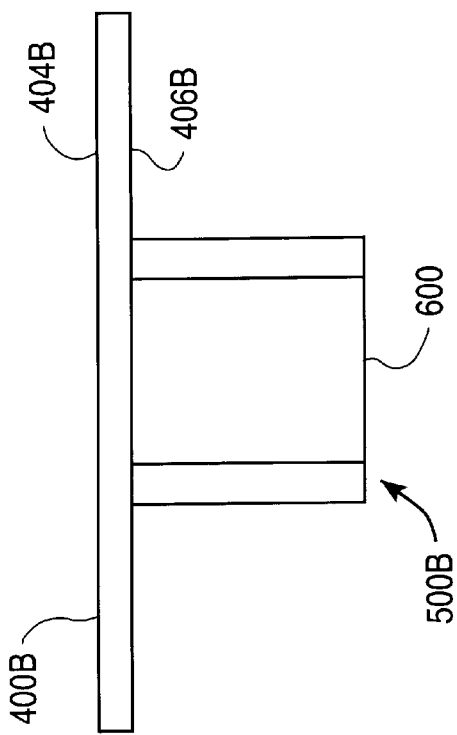
FIG. 7 is a side view of the first embodiment of the connector of the present invention mounted on a double-sided PWB.
Figure 6:
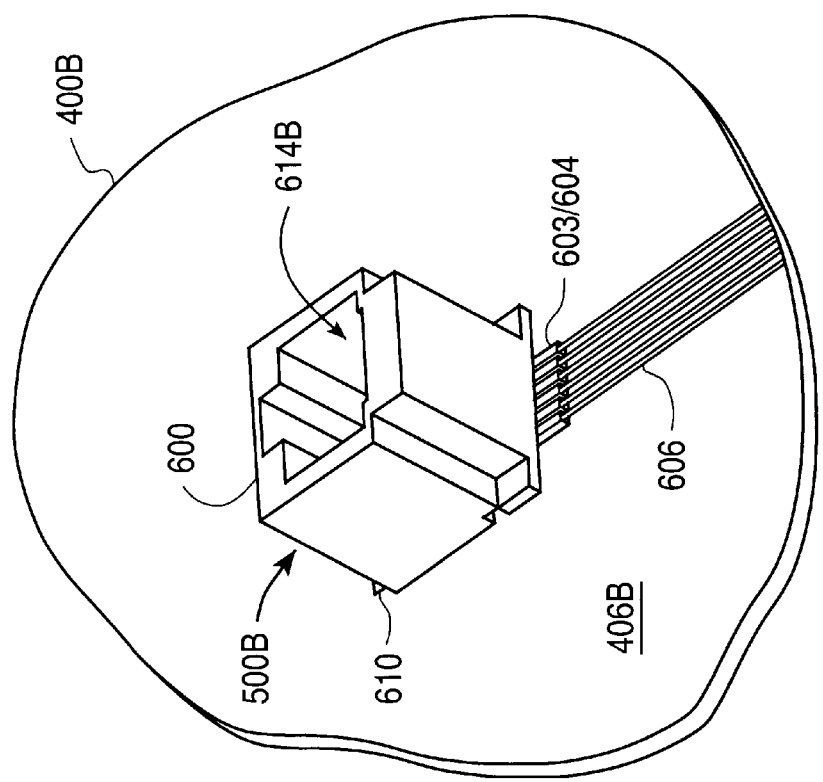
FIG. 6 is a bottom perspective view of the first embodiment of the connector of the present invention mounted on a double-sided PWB.

FIG. 6 is a bottom perspective view of the same Mod 6-pin connector 500B mounted on a double-sided PWB 400B, showing a portion of a lower surface 406B of the PWB 400B. FIG. 7 is a side view of the connector 500B mounted on the double-sided PWB 400B. The PWB 400B has a set of six signal pads 604, a set of six etch runs 606 and a pair of support pads 610 (one of which is partially illustrated FIG. 6) on the lower surface 406B. Unlike the single-side PWB 400A, the PWB 400B does not define an opening, such as the opening 612 of the single-sided PWB 400A. The PWB 400B also has an upper surface 404B.

During assembly of a telephone having the connector 500B and the double-sided PWB 400B, the PWB 400B is placed with the upper surface 404B facing downward. An SMT nozzle is applied to the pick up surface 614B of the connector 500B. The SMT nozzle is then used to place the connector 500B onto lower surface 406B of the PWB 400B, with the leads 602 overlaying the pads 604 and the support tab 608 overlaying the support pads 610. After reflow, the leads 602 are secured to the pads 604, making electrical contact, and the support tab 608 is secured to the support pads 610.

Whether the PWB utilized in a specific telephone model is single-sided or double-sided, the connector 500B extends away from the lower surface 406 of the PWB 400, with access at the bottom. When the entire telephone is assembled, the connector 500B extends down into the support structure 502B. The opening defined by the support structure 502B again provides access to the connector 500B at the bottom of the telephone. However, depending on whether the PWB is single-sided or double-sided, the connector 500B may be mounted on the upper surface 404 or the lower surface 406 of the PWB 400. Thus, the connector 500B of the present invention and the method of mounting the connector 500B to a PWB 400 allows the connector 500B to be mounted on the upper surface 404A of a single-sided PWB 400A or on the lower surface 406B of a double-sided PWB 400B, while providing connector access from the bottom.

When using a single-sided PWB 400A, the upper surface 404A of the PWB 400A is selected as the signal layer so that telephone key pads and other telephone keys can be mounted on the upper surface 404A, providing access at the top of the telephone, through the upper housing component 200. As a consequence, the connectors 500 must also be mounted on the upper surface 404A. When using a double-sided PWB 400B, both the upper surface 404B and the lower surface 406B are signal layers, so that the telephone key pad can be mounted on the upper surface 404B while the connectors 500 are mounted on the lower surface 406B.

The other connectors 500A, 500C and 500D have similar design features to the connector 500B. For example, a body of the connector 500D has a generally box-type shape, although the connector 500D is substantially more elongated than the connector 500B. The single-sided PWB 400A defines an opening for the connector 500D that has dimensions that are slightly larger than the X-Y dimensions of the body of the connector 500D. The connector 500D also has a set of signal leads that extend further in the X-Y plane than the body of the connector 500D. In addition, the connector 500D also has a set of two pickup surfaces 614A and 614B, which are identified in FIG. 9.

Figure 8:
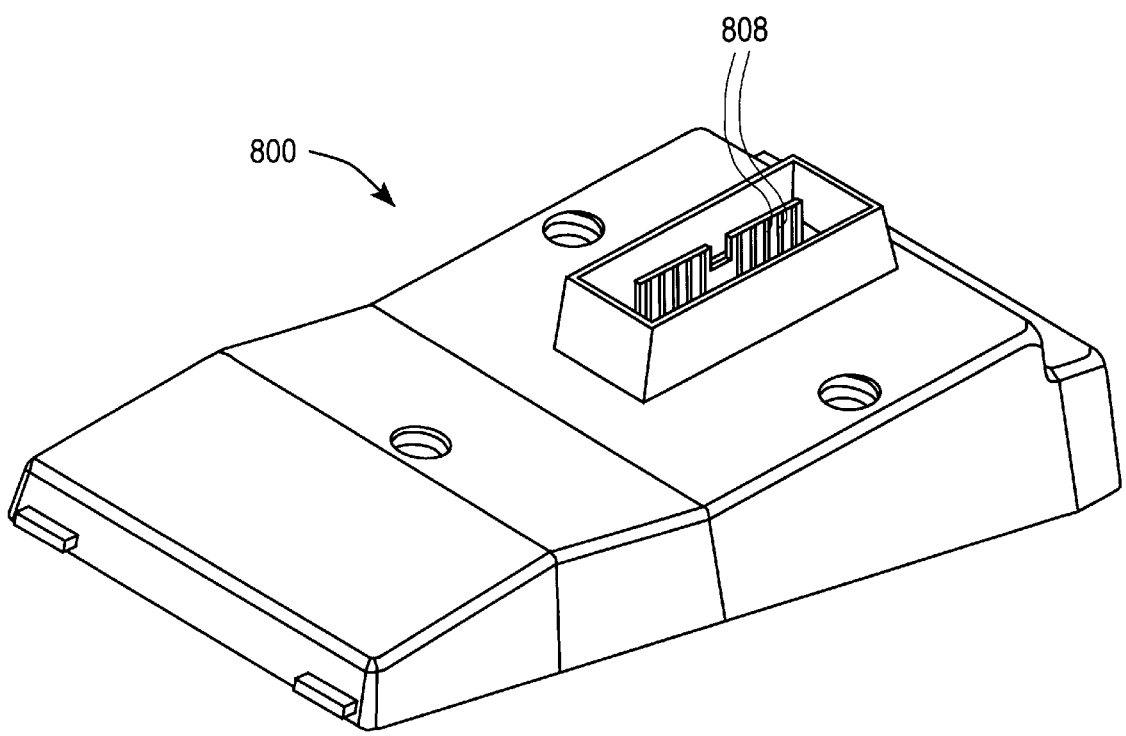
FIG. 8 is a perspective view of an option module that can be inserted into an option module bay of the telephone of FIGS. 1 and 2.

FIG. 8 is a perspective view of a preferred embodiment option module 800 that can be inserted into an option module bay of the telephone 90 of FIGS. 1 and 2 FIGS. 9 and 10 illustrate the electronic interconnection between the option module 800 and the telephone 90. The option module 800 comprises a PWB 804, a card edge connector 500D and an interconnection device 802. The interconnection device 802 is a PWB with two sets of pads 806, 808 and a set of etch runs interconnecting the two sets of pads. A first set of pads 806 engages with the electrical contacts of the card edge connector 500D of the option module 800. When the option module 800 is inserted into an option module bay at the underside of the telephone 90, a second set of pads 808 engages with the electrical contacts of one of the card edge connectors 500D of the telephone 90, depending on which option module bay is selected. The card edge connector 500D of the option module 800 is mounted to a surface of the PWB 804 that is facing the PWB 400 when the option module 800 is inserted into the option module bay. The interconnection device 802 is secured within the option module 800, with the second set of pads 808 extending therefrom to enable engagement with a card edge connector 500D of the telephone 90 at the underside of the telephone 90. The interconnection device 802 is angled to account for the angle defined between the PWB 400 of the telephone 90 and the PWB 804 of the option module 800, when the option module 800 is inserted into the option module bay of the telephone 90. The angle of the interconnection device 802 enables the pads 808 to be substantially perpendicular with the PWB 804 and the pads 806 to be substantially perpendicular with the PWB 400 when the option module 800 is inserted into the telephone 90.

Figure 9:
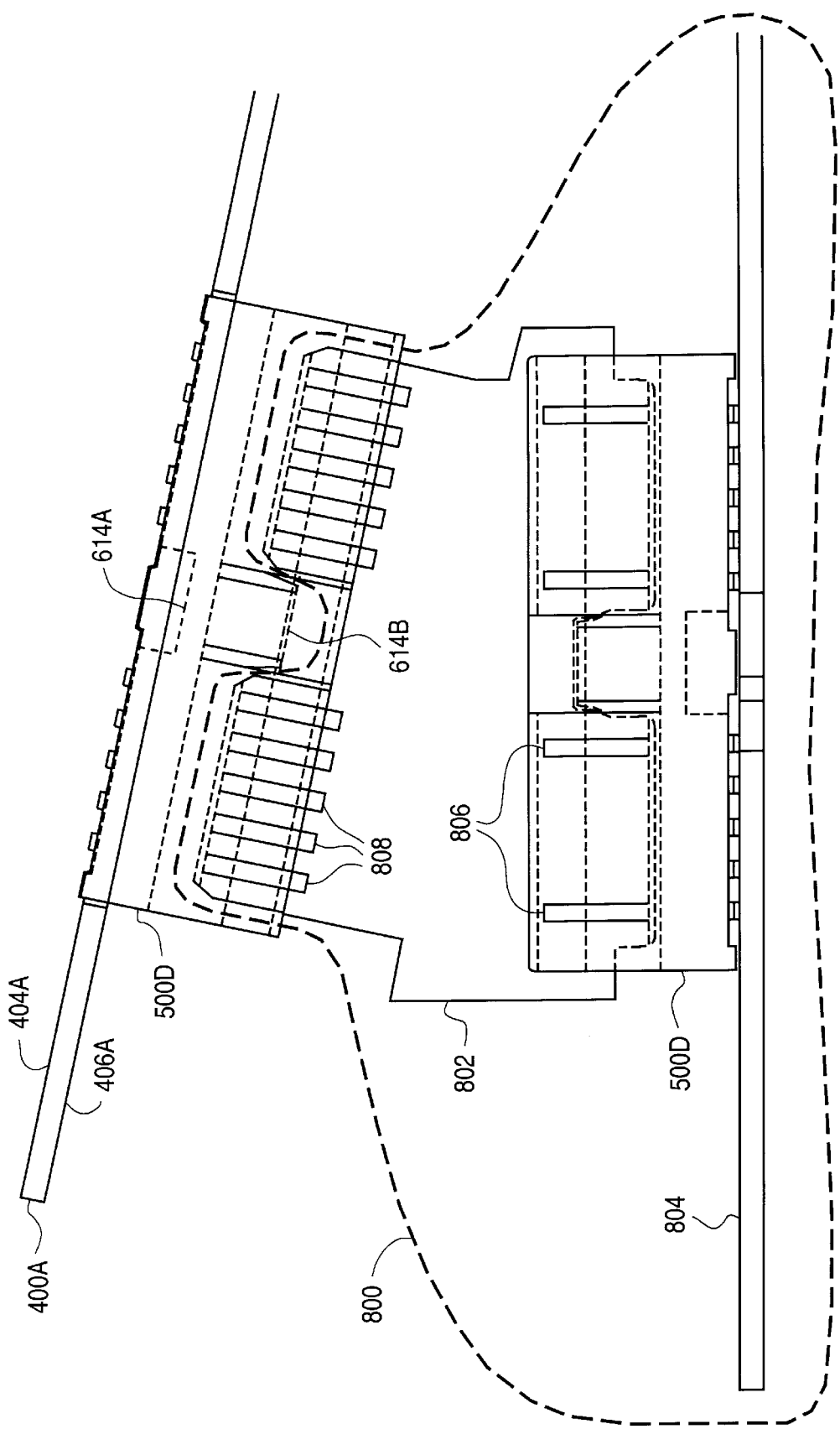
FIG. 9 is a side view of an interconnection mechanism interfacing an option module PWB with a single-sided telephone PWB.
Figure 10:
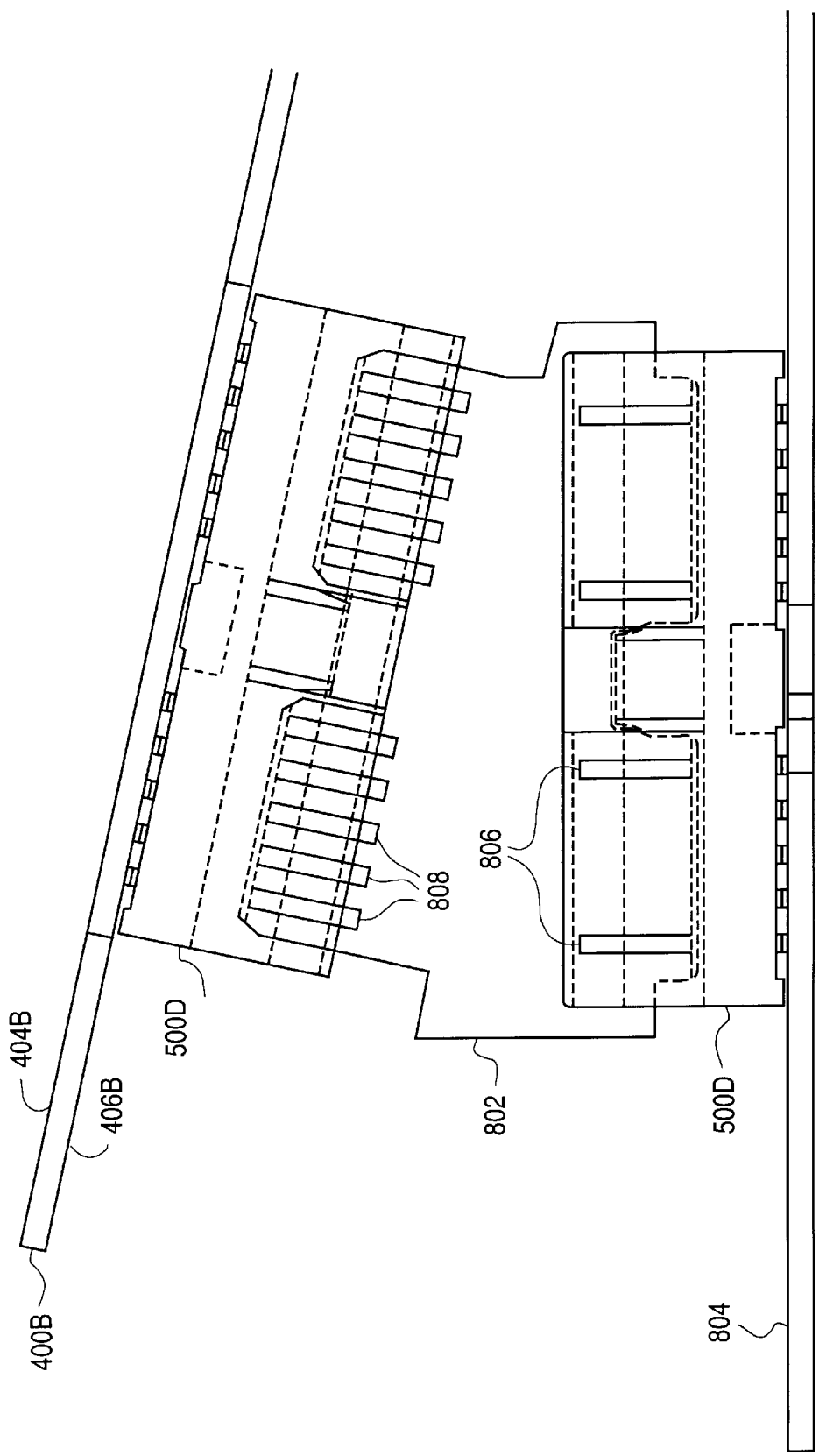
FIG. 10 is a side view of the interconnection mechanism of FIG. 9, interfacing an option module PWB with a double-sided telephone PWB.

FIG. 9 illustrates the interconnection between the option module PWB 804 and the single-sided telephone PWB 400A from the left side of the telephone 90. FIG. 10 illustrates the interconnection between the option module PWB 804 and the double-sided telephone PWB 400B, also from the left side of the telephone 90. As illustrated in FIGS. 9 and 10, the pads 808 do not extend as far into the connector 500D attached to the single-sided PWB 400A as they do in the connector 500D attached to the double-sided PWB 400B. This situation arises because the connector 500D is mounted to the upper surface 404A of the single-sided PWB 400A and the lower surface of 406B of the double-sided PWB 400B. To account for this difference in penetration of the pads 808 into the connector 500D, the internal contacts of the connector 500D have a relatively large area for contact with the pads 808. The relatively large contact surface area of the connector 500D provides sufficient contact with the pads 808 whether the connector 500D is mounted to a single-sided PWB 400A or a double-sided PWB 400B.

What is claimed is:

1. A method of mounting a connector on a PWB to provide access from a first side of the PWB, the PWB also having an opposite side and at least one signal pad, the connector having at least one signal lead, the method comprising the steps of:

if the connector is to be mounted on the first side, placing the connector on the first side with the signal leads of the connector making contact with the signal pads of the PWB, the signal pads of the PWB being on the first side;

if the connector is to be mounted on the opposite side, placing the connector through an opening in the PWB from the opposite side through to the first side with the signal leads of the connector making contact with the signal pads of the PWB, the signal pads of the PWB being on the opposite side; and securing the signal leads of the connector to the signal pads of the PWB.

2. The method of claim 1, wherein the connector has at least one support tab and the PWB has at least one support pad, the method comprising the additional step of securing the support tabs to the support pads, the support pads being on the first side if the connector is to be mounted on the first side and the support pads being on the second side if the connector is to be mounted on the second side.

* * * * *